Patented Apr. 19, 1949

2,467,523

UNITED STATES PATENT OFFICE 2,467,523

ANION EXCHANGE RESINS

James R. Dudley, Cos Cob, Conn., assignor to American Cyanamid Company, New York, N. Y., a corporation of Maine No Drawing. Application December 29, 1945, Serial No. 638,462

20 Claims. (Cl. 210—24)

This invention relates to resinous compositions. More particularly, it relates to resins which are suitable for the removal of anions from liquid media, to processes of preparing such resins, and to processes of purifying liquid media by means of such resins.

An object of the present invention is to provide a new and useful resinous composition.

Another object of the present invention is to provide a resinous material which is insoluble in water and which is suitable for removing anions from, or exchanging anions in, water and other liquid media.

A further object of the present invention is to provide a process of producing resinous materials suitable for the removal of anions from liquid media.

Still another object of the present invention is to prepare a resin from a polyalkylenepolyamine and a substituted 1,3,5-triazine.

These and other objects are attained by bringing together a polyalkylenepolyamine and a substituted 1,3,5-triazine containing at least two functional groups such as —NH$_2$, —OH, —SH, —O alkyl, —Cl, —Br, —S alkyl, etc.

It is a further object of the present invention to provide an improved process for removing anions from water and other liquid media. This object is attained by contacting a liquid medium with a granular, water-insoluble resin prepared as described above.

The present invention will be described in greater detail in conjunction with the following specific examples in which the proportions are given in parts by weight unless otherwise indicated. These examples are merely illustrative and it is not intended that they should restrict the scope of the invention.

Example 1

| | Parts |
|---|---|
| Trithiocyanuric acid (0.3 mol) | 53 |
| 50% aqueous tetraethylenepentamine (0.45 mol) | 170 |
| Water | 50 |

A slurry of the trithiocyanuric acid in water is placed in a vessel suitably equipped with a reflux condenser and agitating means. The tetraethylenepentamine is added to the slurry gradually over a period of about 20 minutes. An exothermic reaction ensues, causing the liberation of hydrogen sulfide and the caking up of the acid. This mixture is heated with steam, and a viscous solution is obtained in about 30 minutes. This solution is heated for several hours with steam to liberate more hydrogen sulfide and is then concentrated at reduced pressure.

The concentrated viscous syrup is cured for about 14 hours by heating at temperatures slowly increased from 100° C. to 175° C. The dark brown, brittle resin has a density of 15.8 lbs. per cubic foot and a capacity for removing anions of 14.7 kilograins of calcium carbonate per cubic foot of resin.

Example 2

| | Parts |
|---|---|
| Trithiocyanuric acid (0.3 mol) | 53 |
| Tetraethylenepentamine (0.525 mol) | 99 |
| Water | 45 |

A solution of the tetraethylenepentamine in water is placed in a reaction vessel such as that used in Example 1, and the trithiocyanuric acid is added gradually thereto. When the temperature is raised to 75° C., considerable hydrogen sulfide is liberated. After the evolution of gas has subsided, the clear viscous solution is refluxed at 106°-107° C. for 2 hours and then cured at 200° C. for 3 hours.

The resulting resin has a density of 14.7 lbs. per cubic foot and a capacity for removing anions of 11.7 kilograins of calcium carbonate per cubic foot of resin.

Example 3

| | Parts |
|---|---|
| Trithiocyanuric acid (0.3 mol) | 53 |
| Diethylenetriamine (0.9 mol) | 93 |
| Ethylene dichloride (0.45 mol) | 45 |
| Sodium hydroxide (0.9 mol) | 37 |
| Water | 100 |

A solution of the diethylenetriamine in 50 parts of the water is placed in a suitable vessel, and the ethylene dichloride is added. This mixture is carefully heated with steam until the reaction becomes exothermic at which point the steam is turned off. As the reaction subsides and the heat of reaction no longer maintains reflux, heat is reapplied by means of steam and maintained for about an hour after refluxing ceases.

After cooling the viscous solution of polyethylenepolyamine hydrochloride which is obtained, a solution containing the sodium hydroxide dissolved in 50 parts of water is carefully added. Some sodium chloride crystallizes in this stage but it need not be removed.

After the formation of the free polyamine, the trithiocyanuric acid is added and the mixture is heated with steam in order to dissolve the trithiocyanuric acid and liberate hydrogen sulfide.

After most of the hydrogen sulfide has been removed at this temperature, the resin solution is heated for 4 hours at 105°–110° C. and then cured for 15½ hrs. at 175°–180° C. The dark, hard, spongy resin obtained has a density of 8 lbs. per cubic foot and a capacity for removing anions from liquid media of 8.8 kilograins calcium carbonate per cubic foot of resin.

Example 4

| | Parts |
|---|---|
| Trithiocyanuric acid (0.6 mol) | 106 |
| Polyethylenepolyamine (1.2 mols) | 564 |

The two reactants are mixed in a suitable vessel. After heating for about 20 minutes a clear viscous solution is obtained from which considerable hydrogen sulfide is liberated. The heating is continued for 5–6 hours to remove most of the hydrogen sulfide; the syrup is then heated an additional 4½ hours at 105°–110° C. and finally cured for 15½ hours at 175°–180° C. The dark brown, spongy resin has a density of 9.6 lbs. per cubic foot and a capacity of 10 kilograins calcium carbonate per cubic foot of resin.

Example 5

| | Parts |
|---|---|
| Trithiocyanuric acid (0.26 mol) | 46 |
| Polyethylenepolyamine (0.78 mol) | 366 |

Example 4 is repeated and the resin obtained has a density of 10 lbs. per cubic foot of resin and a capacity of 11.2 kilograins calcium carbonate per cubic foot of resin.

Example 6

| | Parts |
|---|---|
| Melamine (0.10 mol) | 12.6 |
| Tetraethylenepentamine (0.15 mol) | 28 |
| Concentrated hydrochloric acid (0.024 mol) | .9 |
| Water | 55 |

A solution of the tetraethylenepentamine in water is placed in a suitable reaction vessel and the melamine gradually added. The hydrochloric acid is added to the mixture which is then heated at a temperature gradually increasing to 220° C. The heating is continued for about 24 hours during which time a very dark resin is formed. The resin has a density of 10.5 lbs. per cubic foot and a capacity of 8.2 kilograins calcium carbonate per cubic foot of resin.

Example 7

| | Parts |
|---|---|
| Tetraethylenepentamine (0.375 mol) | 71 |
| Dithioammelide (0.25 mol) | 40 |
| Water | 35 |

A solution of tetraethylenepentamine in water is placed in a suitable vessel equipped with means for reflux and means for mechanical agitation. The dithioammelide is added to the polyamine solution, and this mixture is heated slowly. After refluxing at 110° C. for 3.5 hours, during which time hydrogen sulfide and ammonia are liberated, the hot viscous syrup is cured by heating for about 3 hours at a temperature of 175°–200° C. The resin obtained is dark brown, brittle when cool, very porous, and has a density of 14.5 lbs. per cubic foot and a capacity of 9.3 kilograins calcium carbonate per cubic foot of resin.

Example 8

| | Parts |
|---|---|
| Cyanuric acid (1 mol) | 130 |
| Tetraethylenepentamine (3 mols) | 567 |

The reactants are placed in a suitable vessel and heated. A water soluble resinous material is obtained.

Example 9

| | Parts |
|---|---|
| Tetraethylenepentamine (1.5 mols) | 284 |
| Cyanuric chloride (1 mol) | 185 |
| Water | 500 |

A solution of the tetraethylenepentamine is placed in a suitable reaction vessel and the cyanuric chloride added gradually thereto. The mixture is heated to remove hydrochloride and a water soluble resin is obtained.

Example 10

| | Parts |
|---|---|
| Tetraethylenepentamine (3 mols) | 567 |
| Ammeline (1.5 mols) | 191 |
| Water | 300 |

The procedure of Example 9 is followed, the heating being instrumental in the removal in the example of ammonia. Again a water soluble resin is obtained.

Example 11

| | Parts |
|---|---|
| Tetraethylenepentamine (1.75 mols) | 331 |
| Trimethylcyanurate (1 mol) | 171 |

The reactants are mixed in a suitable reaction vessel and heated. A water soluble resin is obtained.

A similar product is obtained when the reaction is carried out in the presence of a catalytic amount of sodium methylate.

Preparation of the polyethylenepolyamine used in Examples 4 and 5

| | Parts |
|---|---|
| Tetraethylenepentamine (2.2 mols) | 416 |
| Ethylene dichloride (2.2 mols) | 218 |
| Sodium hydroxide (4.4 mols) | 180 |
| Water | 400 |

A concentrated solution of the tetraethylenepentamine dissolved in 100 parts of water is placed in a reaction vessel suitably equipped for reflux and with means for mechanical agitation. While the solution is heated with steam, the ethylene dichloride is added carefully at a rate sufficient to maintain a gentle refluxing. When this addition is complete, 100 parts of water are added to thin the viscous liquid which is then heated for 3 hours with steam.

The sodium hydroxide dissolved in 200 parts of water is carefully added to the resulting solution of polyethylenepolyamine hydrochloride, and the sodium chloride which is formed is filtered off. The concentration of the polyamine solution is calculated as 2.2 mols of polyethylenepolyamine in 1036 parts of solution.

Other methods of preparing long chain polyalkylenepolyamines may be used and the product thereof reacted with a triazine in accordance with the present invention. The tetraethylenepentamine used in the preparation of the above particular longer chain polyalkylenepolyamine may be replaced by other polyalkylene- or polyethylene-polyamines such as diethylenetriamine, triethylenetetramine, etc. Similarly, the ethylene dichloride may be replaced by other alkylene dihalides or halogen hydrins such as trimethylenedichloride, trimethylene dibromide, 1,3-dichlorpropanol-2, epichlorhydrin, etc. Theoretically, resins prepared from a triazine and polyamines obtained by reacting polyethylenepolyamines with ethylene dichloride might be expected to be somewhat inferior to those obtained from polyamines prepared by reacting the same polyethylenepolyamines with trimethylene dihalides, 1,3-dichloropropanol-2, or epichlorhydrin because of the tendency for formation of piperazine rings during the reaction. If piperazine rings are formed, the basicity of the resulting cyclic polyamines would not be as great as if longer chain polyamines had been obtained.

*Preparation of trithiocyanuric acid*

| | Parts |
|---|---|
| Sodium hydrogen sulfide (31 mols) | 1736 |
| Cyanuric chloride (5 mols) | 923 |
| Dioxane | 1550 |
| Water | 2000 |

A solution of the sodium hydrogen sulfide in water is placed in a suitable reaction vessel equipped for reflux and with means for mechanical agitation and is heated to 75°,80° C. by means of steam. A warm filtered solution of the cyanuric chloride in the dioxane is added carefully at such a rate that a reaction temperature of 80°-85° C. is maintained without external heating. The hydrogen sulfide evolved may be passed into a trap containing aqueous sodium hydroxide. After the addition of cyanuric chloride is complete, the reaction mixture is refluxed for 1 to 1½ hours, the solution is filtered, and the salt cake thoroughly washed with water.

The filtrate is divided into 4 parts, each is diluted with from 2500-3000 parts of water, and concentrated hydrochloric acid is added until the pH solution is about 3. Trithiocyanuric acid is precipitated as a light yellow, amorphous solid which after filtering, washing, and drying amounts to a 86.5% yield.

There are, obviously, numerous possible variations of the above process such as, for example, using sodium sulfide in place of the sodium hydrogen sulfide. Moreover it should be evident that the present invention is in no way limited to the particular method of preparation of the trithiocyanuric acid or any other starting material.

Other polyalkylenepolyamines may be substituted for part or all of those used in the preceding examples. Furthermore, mixtures of two, three, five or any other number of polyamines may be employed.

Examples of suitable polyamines include diethylenetriamine, triethylenetetramine, tetraethylenepentamine, pentaethylenehexamine, and all of the higher homologs thereof containing additional —CH$_2$CH$_2$NH— groups in the chain between the primary amino groups. Complex mixture of polyethylenepolyamines of high molecular weight obtained as described above by reaction of polyamines with alkylene dihalides and halogen hydrins or in any other manner may be used.

The 1,3,5-triazines used in the present invention must contain at least two functional groups. These functional groups which may also be termed amine reactive groups include —NH$_2$, —OH, —SH, —O alkyl, —Cl, —Br, —S alkyl, and other groups which are functional and will react with amines.

Part or all of the specific triazines described in the above examples may be replaced by other substituted 1,3,5-triazines having at least two functional groups, i.e., ammelide, monothioammelide, thioammeline, guanamines such as formoguanamine, acetoguanamine, stearoguanamine, benzoguanamine, etc., halogenated 1,3,5-triazines such as 2-chlor-4,6-diamino-1,3,5-triazine, 2-amino-4,6-dichlor-1,3,5-triazine, cyanuric bromide, 2-brom-4,6-diamino-1,3,5-triazine, etc., 2-hydrocarbon-4-hydroxy-6-amino-1,3,5 - triazines where the hydrocarbon may be, for example, methyl, ethyl, butyl, benzyl, phenyl, cyclohexyl, decyl, dodecyl and octadecyl, etc.

The molar ratio of triazine to polyamine may vary within wide limits. In general, I prefer to use from 1 to 2 molar proportions of polyamine for each molar proportion of triazine but from 1 to 10 molar proportions of polyamine for each molar proportion of triazine may be used without departing from the spirit of the invention.

The resins of the present invention, which never possess a gel-like structure but rather are transformed from a viscous liquid directly to a solid resin, are preferably cured for a short time at a high temperature. For example, I prefer to cure the resins for only about 3 hours at about 200° C. While I do not wish to be limited to any particular theory, I believe that the short time of cure is advantageous because it reduces atmospheric oxidation and also ring formation which may take place at elevated temperatures between the free amino groups of the polyamine to form substituted piperazines. Thus oxidation and/or ring formation would deleteriously affect the capacities of resins which were subjected to long cures at high temperature.

I also believe that the high temperature enables relatively inactive functional groups to react thereby increasing the number of cross-links in the polymer and so decreasing the solubility. If too high a temperature is used, however, excessive cross-linking will cause the capacity of the resin to be decreased because fewer free amino groups will be available for the removal of anions.

While some of the resins of the present invention are water insoluble and anion active, others are water soluble. It is believed that substituted triazines in which the functional groups are thio groups are more reactive than the corresponding oxy radicals and hence polymerization is extensive enough to form water-insoluble material.

The water soluble resins of the present invention may be used in the treatment of paper, textiles, leather, etc.

It is an advantage of the water insoluble resins of the present invention that their anion activity increases in hot solution. For example, the capacities will range from 14-21 kilograins calcium carbonate per cubic foot of resin when evaluated in a hot cell at 70° C. This is to be compared with capacities ranging from about 12-14 kilograins of calcium carbonate at room temperature.

Before using the water insoluble resins as anion exchangers, it is preferable to grind the resins and screen them to a particle size of from about 8-60 mesh. Use of larger particles in liquid purification applications causes channeling, and smaller particles of resins have been found to pack, thus reducing the anion exchange efficiency of the material.

The anion active resins may be activated or regenerated by means of dilute alkaline solutions, such as for example, 0.1-10% aqueous solutions of sodium hydroxide, sodium carbonate, etc.

The water-insoluble resinous materials produced in accordance with this invention are suitable for the removal of all kinds of acids and anions in general from liquid media. They may be used to extract the strong mineral acids (preferably in relatively low concentrations), organic acids such as acetic acid, oxalic acid, etc., from water and organic liquids. The anions of salts such as chloride ion from ammonium chloride or sulfate ion from ammonium sulfate may be removed by means of the resinous products described herein.

The anion active resins are useful for many purposes, examples of which are the removal of acid from water, the removal of acid from alcoholic solutions, the purification of sugar juices, the purification of pectin, the removal of acid from aqueous formaldehyde solutions, etc. While the resins are especially suitable for the removal of anions from aqueous media, they may be used to extract acids or anions from liquid media other than water. The resins may be used as absorbents for plant nutrients and as such may be used as a media for growing plants or as a means for applying nutrients to the soil.

To be sufficiently insoluble for practical use in the water purification art, a resin should have a sufficiently low solubility that it will not be dissolved very rapidly by the solution to be treated. Thus, water should not dissolve more than 1 part of resin in 1000 parts of water when passed through a bed of resin (after the first cycle comprising an activation, exhaustion and reactivation of the resin).

I claim:

1. A resinous material obtained by a process comprising the step of bringing together as sole resin forming ingredients at least one polyalkylene polyamine containing a primary amino group and a substituted 1,3,5-triazine containing at least two functional and amine reactive groups.

2. A resinous material as in claim 1 in which the polyalkylene polyamine is a polyethylene polyamine.

3. A resinous material as in claim 1 in which the polyalkylene polyamine is obtained by reaction of a polyethylene polyamine with a member of the group consisting of alkylene dihalides and halohydrins.

4. A resinous material as in claim 1 in which the functional groups are mercapto groups.

5. A resinous material obtained by a process comprising the steps of bringing together as sole resin forming ingredients a polyalkylene polyamine containing a primary amino group and a substituted 1,3,5-triazine containing at least two functional and amine reactive groups, and heating the resulting reaction product.

6. A water-insoluble, granular, resinous material obtained by a process comprising the step of bringing together, as sole resin forming ingredients, tetraethylenepentamine and trithiocyanuric acid.

7. A water-insoluble, granular, resinous material obtained by a process comprising the step of bringing together, as sole resin forming ingredients, tetraethylenepentamine and melamine.

8. A water-insoluble, granular, resinous material obtained by a process comprising the step of bringing together, as sole resin forming ingredients, tetraethylenepentamine and dithioammelide.

9. A process which comprises bringing together as sole resin forming ingredients at least one polyalkylene polyamine containing a primary amino group and a substituted 1,3,5-triazine containing at least two functional and amine reactive groups, and heating the resulting reaction product.

10. A process as in claim 9 in which the polyalkylene polyamine is a polyethylene polyamine.

11. A process which comprises bringing together as sole resin forming ingredients at least one polyalkylene polyamine containing a primary amino group and a substituted 1,3,5-triazine containing at least two functional and amine reactive groups in the presence of water, evaporating the resulting solution of the reaction product to dryness, and curing the resulting resin by heating.

12. A process which comprises bringing together, as sole resin forming ingredients, tetraethylene pentamine and trithiocyanuric acid in the presence of water, evaporating the resulting solution to remove hydrogen sulfide, curing the resin obtained by heating, and granulating the cured resin.

13. A process which comprises bringing together, as sole resin forming ingredients, tetraethylene pentamine and dithioammelide in the presence of water, evaporating the resulting solution to remove hydrogen sulfide and ammonia, curing the resin obtained by heating, and granulating the cured resin.

14. A process which comprises bringing together, as sole resin forming ingredients, tetraethylene pentamine and melamine in the presence of water, evaporating the resulting solution to remove ammonia, curing the resin obtained by heating, and granulating the cured resin.

15. A process for removing anions from liquid media which comprises bringing a liquid medium into contact with a water-insoluble, granular, resinous material obtained by a process which comprises the step of reacting as sole resin forming ingredients at least one polyalkylene polyamine containing a primary amino group with a substituted 1,3,5-triazine containing at least two functional and amine reactive groups, and removing said liquid from contact with said resinous material.

16. A process for removing anions from aqueous liquids which comprises bringing an aqueous liquid into contact with a water-insoluble, granular, resinous material obtained by a process which comprises the step of reacting as sole resin forming ingredients at least one polyalkylene polyamine containing a primary amino group with a substituted 1,3,5-triazine containing at least two functional and amine reactive groups, and removing said aqueous liquid from contact with said resinous material.

17. A process for removing anions from water which comprises bringing the water into contact with a water-insoluble, granular, resinous material obtained by a process which comprises the step of reacting as sole resin forming ingredients at least one polyalkylene polyamine containing a primary amino group with a substituted 1,3,5-triazine containing at least two functional and amine reactive groups, and removing said water from contact with said resinous material.

18. A process for removing anions from an aqueous liquid which comprises passing said liquid through a bed of water-insoluble, granular, resinous material obtained by a process comprising the step of bringing together, as sole resin forming ingredients, a polyethylene polyamine and trithiocyanuric acid.

19. A process for removing anions from an aqueous liquid which comprises passing said liquid through a bed of water-insoluble, granular, resinous material obtained by a process comprising the step of bringing together, as sole resin forming ingredients, a polyethylene polyamine and melamine.

20. A process for removing anions from an aqueous liquid which comprises passing said liquid through a bed of water-insoluble, granular, resinous material obtained by a process comprising the step of bringing together, as sole resin forming ingredients, a polyethylene polyamine and dithioammelide.

JAMES R. DUDLEY.

REFERENCES CITED

The following references are of record in the file of this patent:

UNITED STATES PATENTS

| Number | Name | Date |
| --- | --- | --- |
| 1,874,639 | Scott | Aug. 30, 1932 |
| 2,251,234 | Swain | July 29, 1941 |
| 2,388,235 | Bowman | Nov. 6, 1945 |